United States Patent [19]

Miller

[11] 4,167,130

[45] Sep. 11, 1979

[54] METHOD FOR CUTTING SHEET MOULDING COMPOUND REINFORCING STRANDS

[75] Inventor: Everett R. Miller, Granville, Ohio

[73] Assignee: Owens-Corning Fiberglas Corporation, Toledo, Ohio

[21] Appl. No.: 863,298

[22] Filed: Dec. 22, 1977

[51] Int. Cl.² .................................................. B26F 1/20
[52] U.S. Cl. ........................................... 83/866; 83/30; 83/39; 83/678
[58] Field of Search ................. 83/2, 678, 346, 347, 83/302, 408, 30, 39

[56] References Cited

U.S. PATENT DOCUMENTS

| | | | |
|---|---|---|---|
| 2,068,456 | 1/1937 | Hooper | 83/2 X |
| 2,870,840 | 1/1959 | Kwitek | 83/302 X |
| 3,162,076 | 12/1964 | Emerson et al. | 83/678 X |
| 3,495,487 | 2/1970 | Miner | 83/678 X |
| 3,823,633 | 7/1974 | Ross | 83/678 X |
| 3,835,754 | 9/1974 | Lewyckyj | 83/678 X |
| 3,891,494 | 6/1975 | Hunter | 83/678 X |

Primary Examiner—Frank T. Yost
Attorney, Agent, or Firm—Ronald C. Hudgens; Philip R. Cloutier; Greg Dziegielewski

[57] ABSTRACT

The invention relates to a method for cutting continuous reinforcing material in a sheet molding compound comprising passing the sheet molding compound into contact with a plurality of blades projecting from the exterior surface of a rotating roll. The blades pierce the sheet molding compound to sever the continuous reinforcing material located therein as the sheet molding compound is advanced past the roll.

6 Claims, 3 Drawing Figures

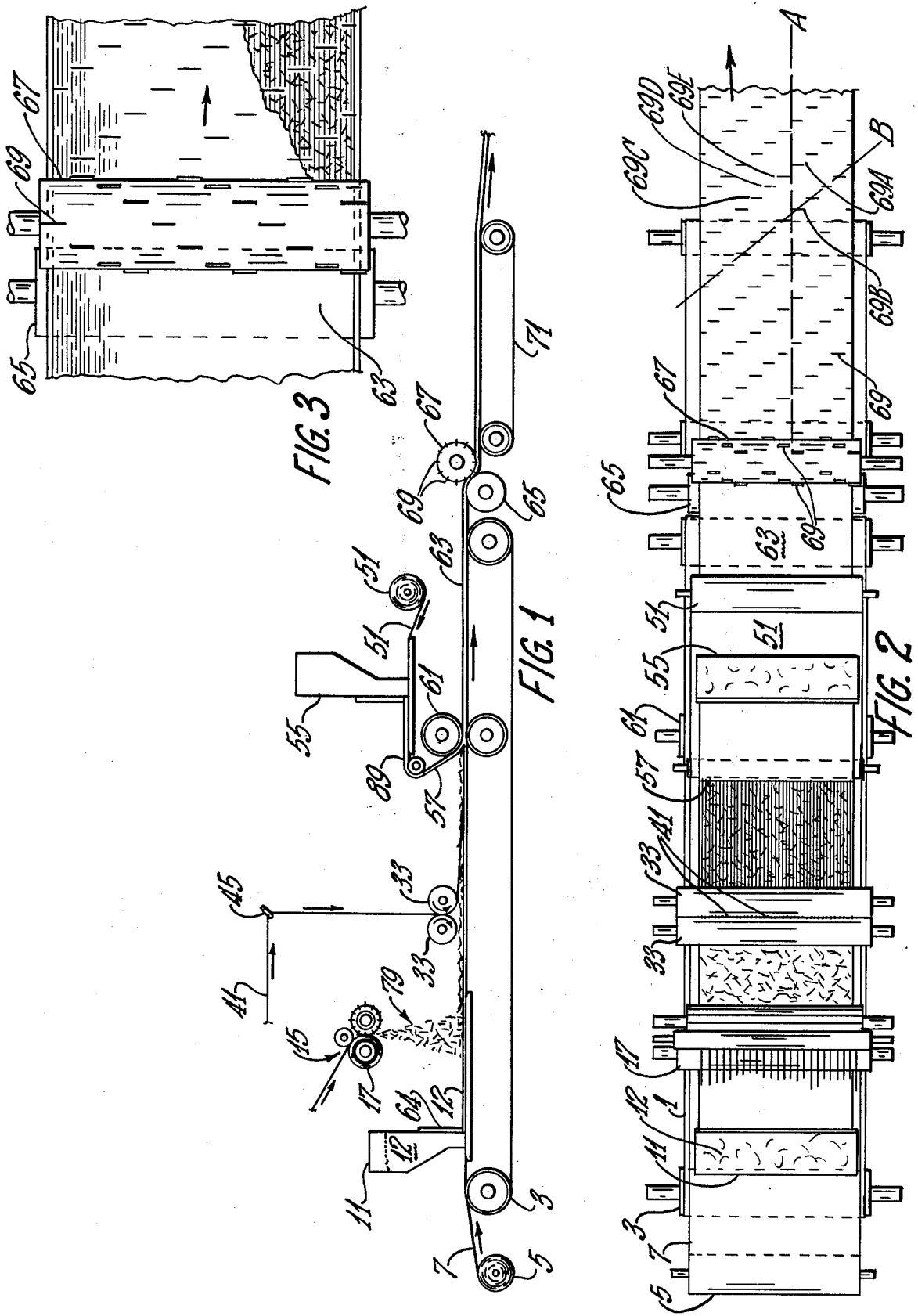

METHOD FOR CUTTING SHEET MOULDING COMPOUND REINFORCING STRANDS

This invention relates to a method and apparatus for producing a molding compound in sheet form, the molding compound containing unidirectionally oriented chopped reinforcing material. More particularly, the invention relates to severing unidirectionally oriented continuous reinforcing material in a molding compound.

In the past, a number of devices have been used to produce molding compounds in sheet form, the mold containing unidirectionally oriented chopped reinforcments. Usually these devices deposit a randomly oriented chopped reinforcing material, a unidirectionally oriented chopped reinforcing material and a resinous material between two carrier sheets to form a composite. Then the composite is passed through a compaction section to wet out the reinforcements with resin. However, it is very difficult to maintain a uniform distribution of the unidirectionally oriented chopped reinforcement material in the molding compound. The reinforcing materials normally used are fed from a wound package to a chopper which deposits the reinforcement material unidirectionally on the composite. However, since the reinforcing material is in a wound package, the material usually contains a certain amount of curl, or twist, which causes the reinforcement material to curl or twist when it is deposited in the composite material. The unidirectionally oriented reinforcing material also has a tendency to move about as the molding compound passes through the compaction section and is collected. Obviously, the curl, twist and movement of the unidirectionally oriented reinforcing material will cause the molding compound to contain a reinforcing material that is no longer uniformly unidirectionally oriented. This can impair the quality of the molding compound and can also impair the physical properties of any articles that are molded using the compound. This is especially significant when the molding compounds containing unidirectionally oriented reinforcement material are used in structural applications.

According to this invention there is provided a process and apparatus for cutting the continuous reinforcing material in a continuous sheet which comprises contacting said sheet with cutting surface to pierce said sheet with said cutting surfaces to form a plurality of discontinuous cuts extending across the width of said sheet and to cut said continuous reinforcing material contained therein. Also according to the invention there is provided a method of cutting continuous reinforcing material in a sheet molding compound comprising passing the sheet molding compound into contact with the exterior surface of a rotating cutting roll. The blades pierce the sheet molding compound to sever the continuous reinforcing material located therein as the sheet molding compound is advanced past the roll, the cuts being non-continuous but acting to separate the sheet into a plurality of interconnected, parallel-positioned segments. The invention further provides apparatus for cutting continuous reinforcing material in a sheet molding compound comprising a rotatable roll having a plurality of blades projecting from the exterior surface of the roll.

DESCRIPTION OF THE DRAWINGS

FIG. 1 is a side elevation view of the apparatus for producing sheet molding compound.

FIG. 2 is a top view of the apparatus for producing sheet molding compound.

FIG. 3 is a partial top view of the piercing and cot roll used to sever the continuous reinforcing material in the sheet molding compound.

The invention will be more fully explained in the following description with reference being made to the attached drawings. FIGS. 1, 2 and 3 show apparatus for producing a reinforced resinous molding compound in sheet form. The apparatus has a movable conveyor 1 supported by rollers and driven by drive roll 3. Any conventional drive means can be used to drive or rotate the drive rolls 3. As the conveyor passes around the drive rolls, it forms a continuous closed loop around the drive rolls.

At one end of the conveyor, a first roll 5 of a sheet material is located. The sheet material 7 can be unrolled from the roll onto the upper surface of the conveyor. The sheet material will be of a width that extends across substantially the entire width of the conveyor. Although a number of materials can be used for the sheet material, it has been found that thin polyethelene is very satisfactory.

A reservoir 11 for holding a flowable resin material 12 is positioned along the conveyor to deposit resin on the sheet material.

If it is desired to incorporate discontinuous fibers into the molding composition, a chopper 15 for chopping reinforcing material 25, such as glass fibers, to a predetermined length is positioned above the conveyor. The chopper is of the usual construction and produces chopped reinforcement 79.

The continuous reinforcing material 41 can be fed through guide eye 45 and between the nip formed between rotatable rolls 33. The rotatable rolls 33 are positioned with respect to the surface of the conveyor to feed the continuous reinforcing material onto the conveyor.

A second roll of thin sheet material 51 is positioned along the path of the conveyor. The sheet material 51 from this roll passes beneath a resin reservoir 55, around a rotatable roll 57 and onto the surface of the conveyor. The resin-covered sheet material is then fed into compaction roll 61.

Compaction roll 61 is positioned above the conveyor and the compaction roll extends across the entire width of the conveyor. The compaction roll is positioned in contact with the upper surface of the second sheet of material on the conveyor. A series of compaction rolls or a mesh belt that passes around a plurality of rolls can also be used.

A resilient rotatable cot roll 65 and a rotatable piercing roll 67 are positioned near the end of the conveyor 1. The piercing roll 67 contains a plurality of blades 69 that are positioned around the exterior surface or periphery of the piercing roll. The longitudinal axis of each blade extends along only a portion of the longitudinal axis of the piercing roll. The blades are positioned in a series of rows around the exterior surface or periphery of the piercing roll and the blades in adjacent rows are in staggered relationship, the blades being in non-contiguous, step-wise positioning across the width of the roll. The blades are positioned so that a plane perpendicular to the longitudinal axis of the piercing roll and in contact with the edges of a row of blades would also contact the edges of the baldes in the next adjacent row.

Referring to FIG. 2, blades 69 can be positioned in any configuration. Preferably, they will be positioned such that, with reference to imaginary line A, blade 69A and blade 69B are separated by from one to about 3 rows of intervening blades, 69C, 69D and 69E. Also, blades 69A and 69B are positioned such that imaginary line A, extending substantially parallel to the longitudinal axis of the sheet of reinforced resin, contacts the corresponding edges of blades 69A and 69B and all blades lying along the same vertical plane. Preferably, also, the blades in successive rows along imaginary line B will be displaced at an angle of from about 30° to about 60°.

It will be understood that the method and apparatus of this invention does not cut the sheet into separable segments but rather cuts the continuous fibers into segments within the unified sheet. It is possible, however, to subsequentially cut the material along its longitudinal axis. As an alternate, the molding compound can be formed containing continuous reinforcing material, wound into a package and stored until needed for molding. When the compound is ready for molding, the compound is passed between the cot and piercing roll to cut the continuous reinforcing material to the desired length. Since the continuous reinforcing material need not be cut until the compound is to be molded, the piercing roll or blades on the piercing roll can be modified to cut the continuous reinforcing material to the length or pattern desired for the end product to be molded. This is especially important when the molding compound is to be used for a number of end uses requiring different lengths or patterns of unidirectionally oriented reinforcing material. Under these conditions the molding compound can be made with continuous reinforcing material and then the reinforcing material can be cut or severed to obtain the unidirectionally oriented reinforcing material desired. When a different length or pattern on the reinforcing material is required the piercing roll or blades on the piercing roll can be modified to cut the reinforcing material in the desired fashion. The piercing roll can be modified so that some of the continuous reinforcing material will not be cut to produce a molding compound having unidirectional oriented continuous and discontinuous reinforcing material.

Having described the invention in detail and with reference to the drawings, it will be understood that such specifications are given for the sake of explanation. Various modifications and substitutes, other than those cited, can be made without departing from the scope of the invention as defined by the following claims.

What is claimed is:

1. A method of cutting continuous reinforcing strands positioned in a sheet of sheet molding compound comprising:
   (a) contacting said sheet with cutting edges;
   (b) piercing said sheet with said cutting edges to form a plurality of discontinuous cuts extending along the width of said sheet and to cut said reinforcing material contained in said sheet.
2. The method of claim 1 in which said cuts are positioned adjacently along the length of said sheet in stepwise manner.
3. The method of claim 1 in which said cuts in adjacent rows are positioned along an imaginary line forming an angle with the longitudinal axis of said sheet within the range of from about 30° to about 60°.
4. The method of claim 1 in which said cuts sever substantially all of said continuous reinforcing material in said sheet.
5. The method of claim 1 in which said sheet comprises discontinuous reinforcing material.
6. The method of claim 1 in which said sheet is cut along its longitudinal axis subsequent to step (b).

* * * * *